(12) United States Patent
Lu

(10) Patent No.: US 11,011,207 B1
(45) Date of Patent: May 18, 2021

(54) HARD DISK DRIVE TRAY AND HARD DISK DRIVE TRAY MODULE

(71) Applicant: HONGFUJIN PRECISION ELECTRONICS(TIANJIN)CO.,LTD., Tianjin (CN)

(72) Inventor: Wen-Hu Lu, Tianjin (CN)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 17/036,327

(22) Filed: Sep. 29, 2020

(30) Foreign Application Priority Data

Jun. 30, 2020 (CN) .......................... 202010621734.7

(51) Int. Cl.
| | | |
|---|---|---|
| *G11B 33/12* | (2006.01) | |
| *G11B 33/04* | (2006.01) | |
| *G11B 17/047* | (2006.01) | |
| *G06F 1/18* | (2006.01) | |

(52) U.S. Cl.
CPC ............ *G11B 33/124* (2013.01); *G06F 1/187* (2013.01); *G11B 17/047* (2013.01); *G11B 33/0466* (2013.01); *G11B 33/128* (2013.01)

(58) Field of Classification Search
None
See application file for complete search history.

(56) References Cited

U.S. PATENT DOCUMENTS

| | | | |
|---|---|---|---|
| 10,455,724 B1* | 10/2019 | Zhang et al. | ........ G11B 33/128 |
| 2015/0192970 A1* | 7/2015 | Jau et al. | ............. G11B 33/128 |
| | | | 361/679.33 |

* cited by examiner

*Primary Examiner* — Craig A. Renner
(74) *Attorney, Agent, or Firm* — ScienBiziP, P.C.

(57) ABSTRACT

A hard disk drive tray includes a tray body, a handle, and two elastic locking members. The tray body includes a bottom wall and two side walls. A first evading groove is defined in each side wall. The side wall includes a first clamping portion. The handle includes two handle operating portions and a beam portion. The handle operating portion is connected to the side wall. A second clamping portion is formed in the first limiting groove. Each elastic locking member includes a first side portion, a top portion, and a locking portion. A third clamping portion is formed on the first side portion. The locking portion is blocked by the second clamping portion, and the third clamping portion is blocked by the first clamping portion. When the elastic locking member is pushed toward the second clamping portion, the third clamping portion is separated from the first clamping portion.

14 Claims, 14 Drawing Sheets

HARD DISK DRIVE TRAY AND HARD DISK DRIVE TRAY MODULE

FIELD

The subject matter of the application generally relates to a hard disk drive tray and a hard disk drive tray module.

BACKGROUND

A hard disk drive is indispensable to a cabinet server. The hard disk drive is generally fixed in the cabinet server by the hard disk drive tray. However, the disassembly of hard disk drive tray in the existing technology requires the help of disassembly tools, high cost and large space.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
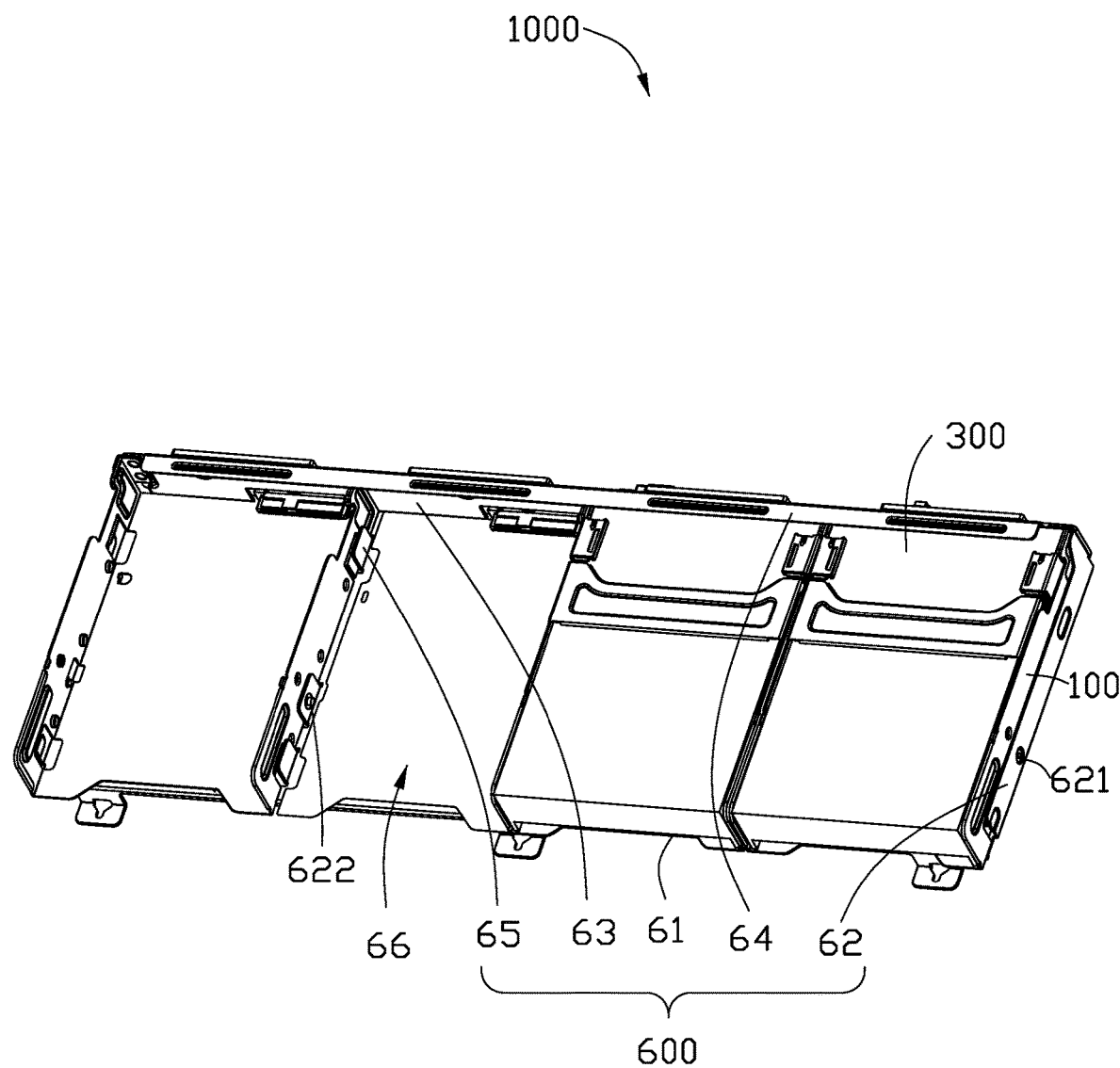
FIG. 1 is a perspective view of an embodiment of a hard disk drive tray module with hard disk drives according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

FIGS. 1-14 show an embodiment of a hard disk drive tray module 1000. The hard disk drive tray module 1000 carries and fixes at least one hard disk drive 300. The hard disk drive tray module 1000 is applicable to any one cabinet type server.

Referring to FIG. 1, the hard disk drive tray module 1000 includes a tray fixing member 600 and at least one hard disk drive tray 100 received and fixed in the tray fixing member 600. The hard disk drive 300 is received and fixed in the hard disk drive tray 100. One hard disk drive 300 is corresponding to one hard disk drive tray 100.

The tray fixing member 600 includes a bottom plate 61, two first side plates 62, a second side plate 63, a top plate 64, and at least one separating plate 65. The two first side plates 62 are opposite to each other. The second side plate 63 is connected to the two first side plates 62. The two first side plates 62 and the second side plate 63 are connected to bottom plate 61. The top plate 64 extends from the second side plate 63. In at least one embodiment, the second side plate 63 is perpendicularly connected to the two first side plates 62, the two first side plates 62 and the second side plate 63 are perpendicularly connected to the bottom plate 61, and the top plate 64 is perpendicularly connected to the second side plate 63. The top plate 64 and the two first side plates 62 are formed on a same side of the second side plate 63. The separating plate 65 is fixed on the bottom plate 61 to separate the tray fixing member 600 into at least two tray receiving grooves 66. One hard disk drive tray 100 is received and fixed in one tray receiving grooves 66. A plurality of first locating holes 621 are respectively defined in the separating plate 65 and the two first side plates 62. A plurality of first locating pins 622 are fixed in the plurality of first locating holes 621. One first locating pin 622 is corresponding to one first locating hole 621.

Figure 2:
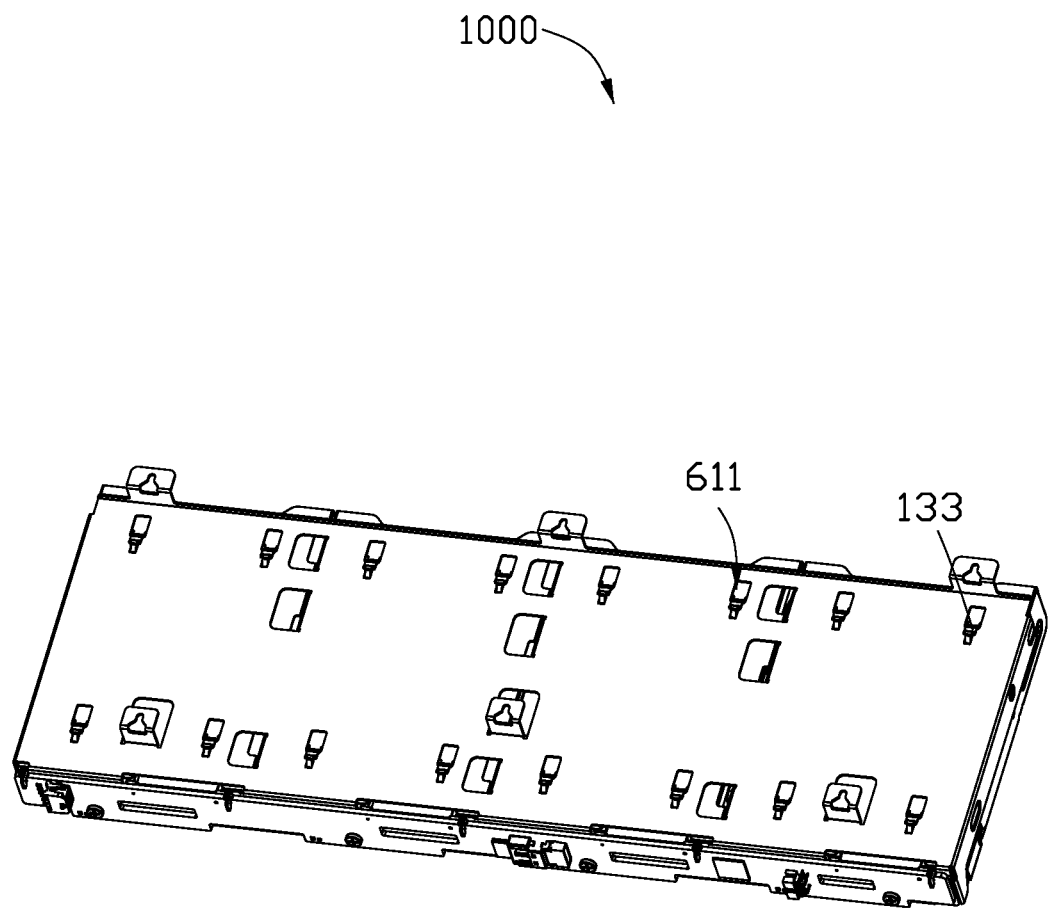
FIG. 2 is a perspective view of the hard disk drive tray module of FIG. 1 from another angle.

Referring to FIG. 2, at least one fourth limiting groove 611 is defined in the bottom plate 61. The fourth limiting groove 611 is used to limit the hard disk drive tray 100 to move.

Figure 3:
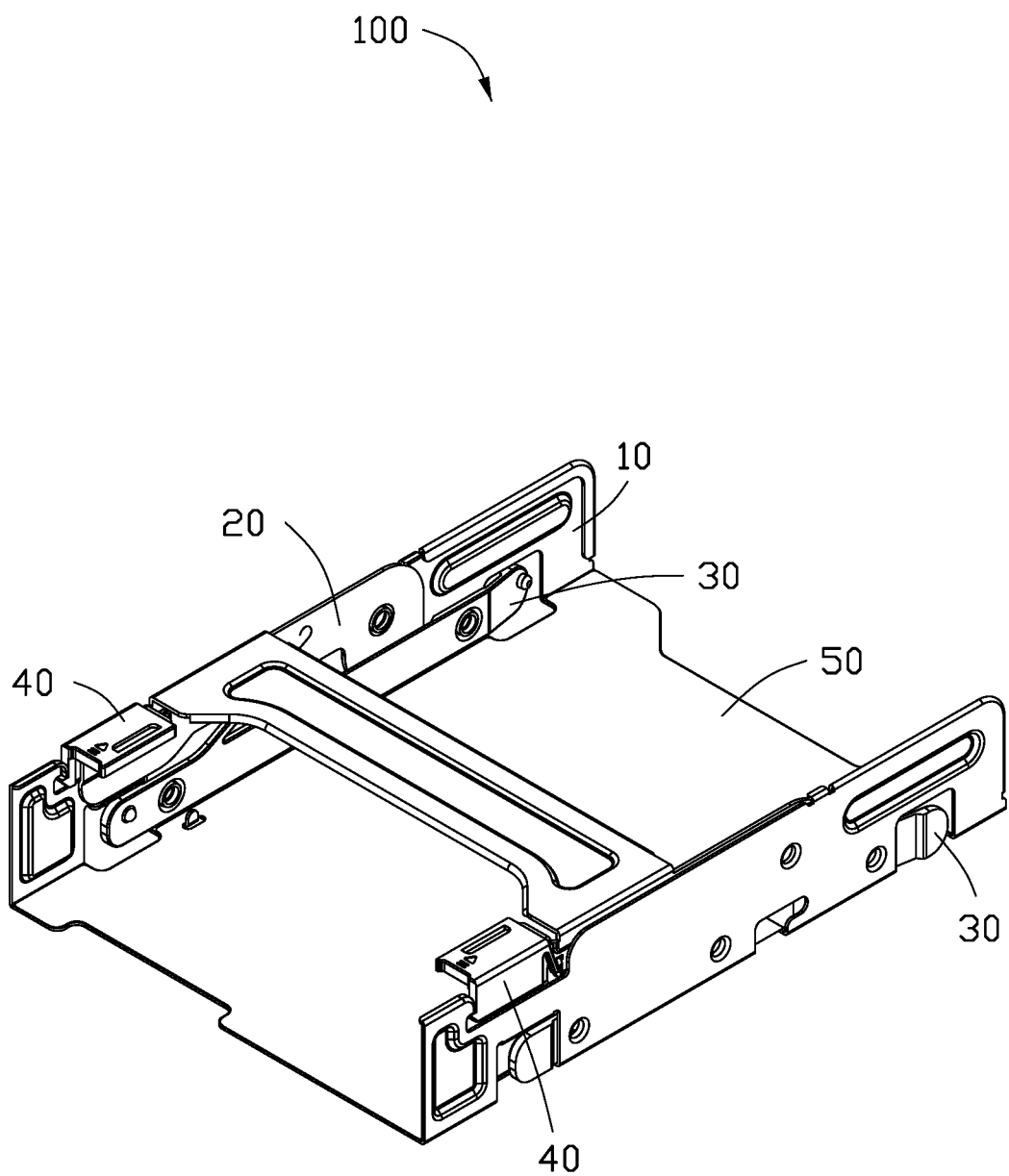
FIG. 3 is a perspective view of a hard disk drive tray of the hard disk drive tray module of FIG. 1. A handle of the hard disk drive tray is closed.
Figure 4:
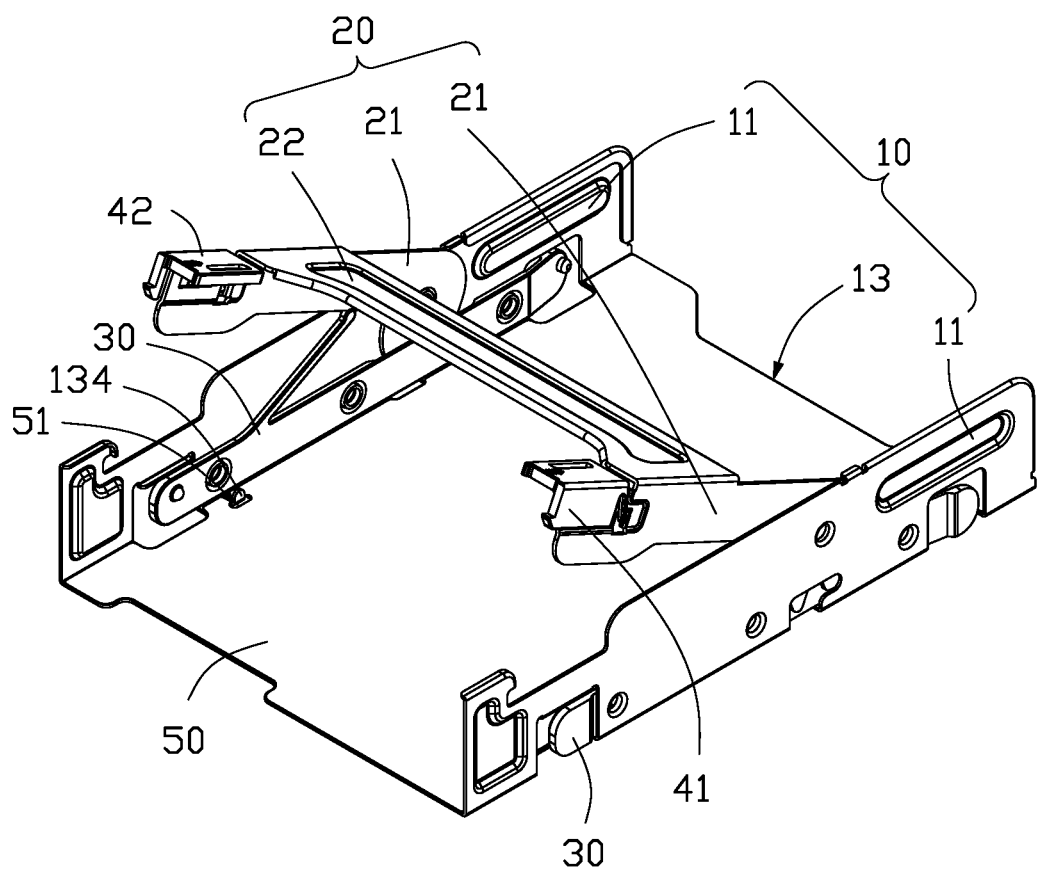
FIG. 4 is a perspective view of a hard disk drive tray of the hard disk drive tray module of FIG. 3. The handle of the hard disk drive tray is opened.

Referring to FIGS. 3 and 4, each of the hard disk drive tray 100 includes a tray body 10, a handle 20, two elastic maintaining members 30, two elastic locking members 40, and an insulation sheet 50. One end of the handle 20 is rotationally connected to the tray body 10, and the other end of the handle 20 is connected to the tray body 10 by the two elastic locking members 40. The handle 20 is used to clamp the hard disk drive 300. The two elastic maintaining members 30 are fixed on two opposite sides of the tray body 10, respectively. The two elastic maintaining members 30 are used to fix the hard disk drive 300. The two elastic locking members 40 are respectively connected to the handle 20 and capable of moving on the handle 20. When the handle 20 clamps the hard disk drive 300, one ends of the two elastic locking members 40 are clamped on the tray body 10. The insulation sheet 50 is fixed on the tray body 10.

Referring to FIG. 4, at least one connecting hole 51 is defined in the insulation sheet 50. In at least one embodiment, the insulation sheet 50 includes two connecting holes 51.

Figure 5:
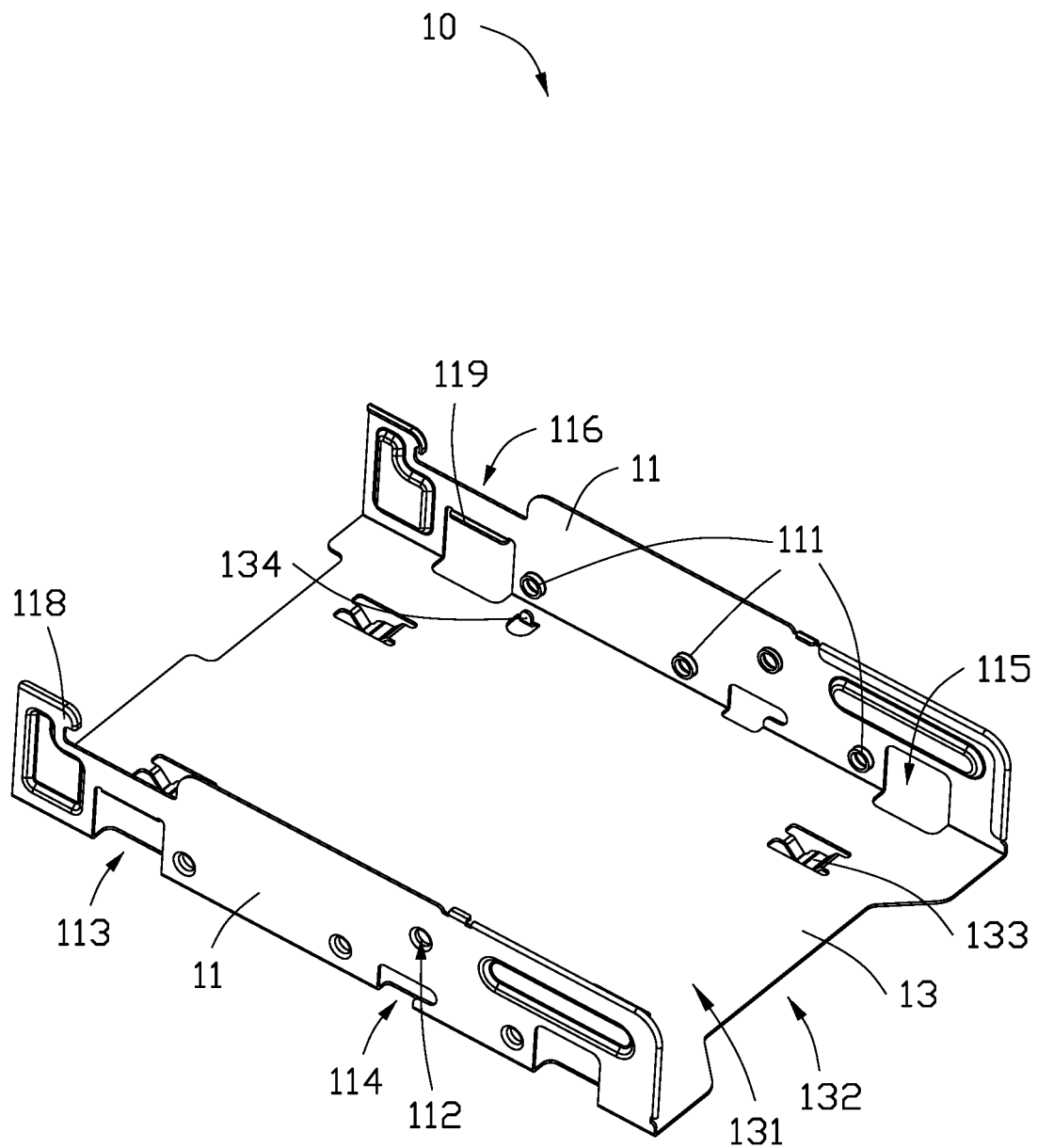
FIG. 5 is a perspective view of a tray body of the hard disk drive tray of FIG. 3.

Referring to FIG. 5, the tray body 10 includes a bottom wall 13 and two side walls 11 perpendicularly connected to the bottom wall 13. The two side walls 11 are opposite to each other. The two elastic maintaining members 30 are respectively fixed on the two side walls 11. One end of the handle 20 is rotationally connected to the two side walls 11. When the handle 20 clamps the hard disk drive 300, one ends of the two elastic locking members 40 are clamped on the two side walls 11. The insulation sheet 50 is fixed on the bottom wall 13 of the tray body 10.

At least two first fixing holes 111 and a second fixing hole 112 are defined in each side wall 11. The second fixing hole 112 is above the first fixing holes 111. The first fixing holes 111 are used to fix the two elastic maintaining members 30 on the side walls 11. The second fixing hole 112 is used to rotationally connect one end on the handle 20 to the side walls 11. In at least one embodiment, each side wall 11 includes three first fixing holes 111.

A fourth evading groove 113, a third limiting groove 114, a third evading groove 115, and a first evading groove116 are defined in each side wall 11. The first fixing holes 111 are formed between the fourth evading groove 113 and the third evading groove 115. The fourth evading groove 113 and the third evading groove 115 are both defined in junctions of the side walls 11 and the bottom wall 13. The fourth evading groove 113 and the third evading groove 115 both penetrate a portion of the side walls 11 and a portion of the bottom wall 13. The fourth evading groove 113 and the third evading groove 115 both L-shaped. The third limiting groove 114 is formed between the fourth evading groove 113 and the third evading groove 115 and below the second fixing hole 112. In at least one embodiment, the third limiting groove 114 is formed between two of the first fixing holes 111 closing to the third evading groove 115. The third limiting groove 114 is defined in junctions of the side walls 11 and the bottom wall 13 and penetrates a portion of the side walls 11 and a portion of the bottom wall 13. A portion of the third limiting groove 114 on the side wall 11 extends to the third evading groove 115. The portion of the third limiting groove 114 on the side wall 11 has a size that is greater than that of a portion of the third limiting groove 114 on the bottom wall 13. The first evading groove116 is above the fourth evading groove 113 and penetrates the side wall 11 and penetrates a surface of the side wall 11 away from the bottom wall 13.

The side wall 11 includes a first clamping portion 118 extending from an inner wall of the first evading groove116 away from the third limiting groove 114. The first clamping portion 118 is used to match one of the two elastic locking members 40 to make the handle 20 to clamp the hard disk drive 300.

The side wall 11 further includes a supporting portion 119 extending from the side wall 11. The supporting portion 119 is perpendicularity extending from the side wall 11. The supporting portions 19 on the side walls 11 are opposite to each other. The supporting portions 19 are located on one end of the fourth evading grooves 113 away from the bottom wall 13. The supporting portions 19 are used to support the handle 20.

The bottom wall 13 includes a first surface 131 and a second surface 132 opposite to the first surface 131. The side walls 11 are formed on the first surface 131. At least one limiting structure 133 is defined in the bottom wall 13. In at least one embodiment, the limiting structure 133 protrudes toward a direction away from the handle 20. The limiting structure 133 protrudes the second surface 132. In at least one embodiment, the limiting structure 133 is bent-shaped, an amount of the limiting structure 133 is four. When the hard disk drive 300 is received in the tray receiving groove 66, the limiting structure 133 passes through the fourth limiting groove 611 to limit the hard disk drive tray 100 to move.

The bottom wall 13 further includes at least one fourth clamping portion 134 protruding the first surface 131. In at least one embodiment, the fourth clamping portion 134 is formed by cutting and bending a portion of the bottom wall 13, and an amount of the fourth clamping portion 134 is two. When the insulation sheet 50 is mounted on the bottom wall 13, the fourth clamping portions 134 pass through the connecting holes 51 to fix the insulation sheet 50 on the bottom wall 13.

Figure 6:
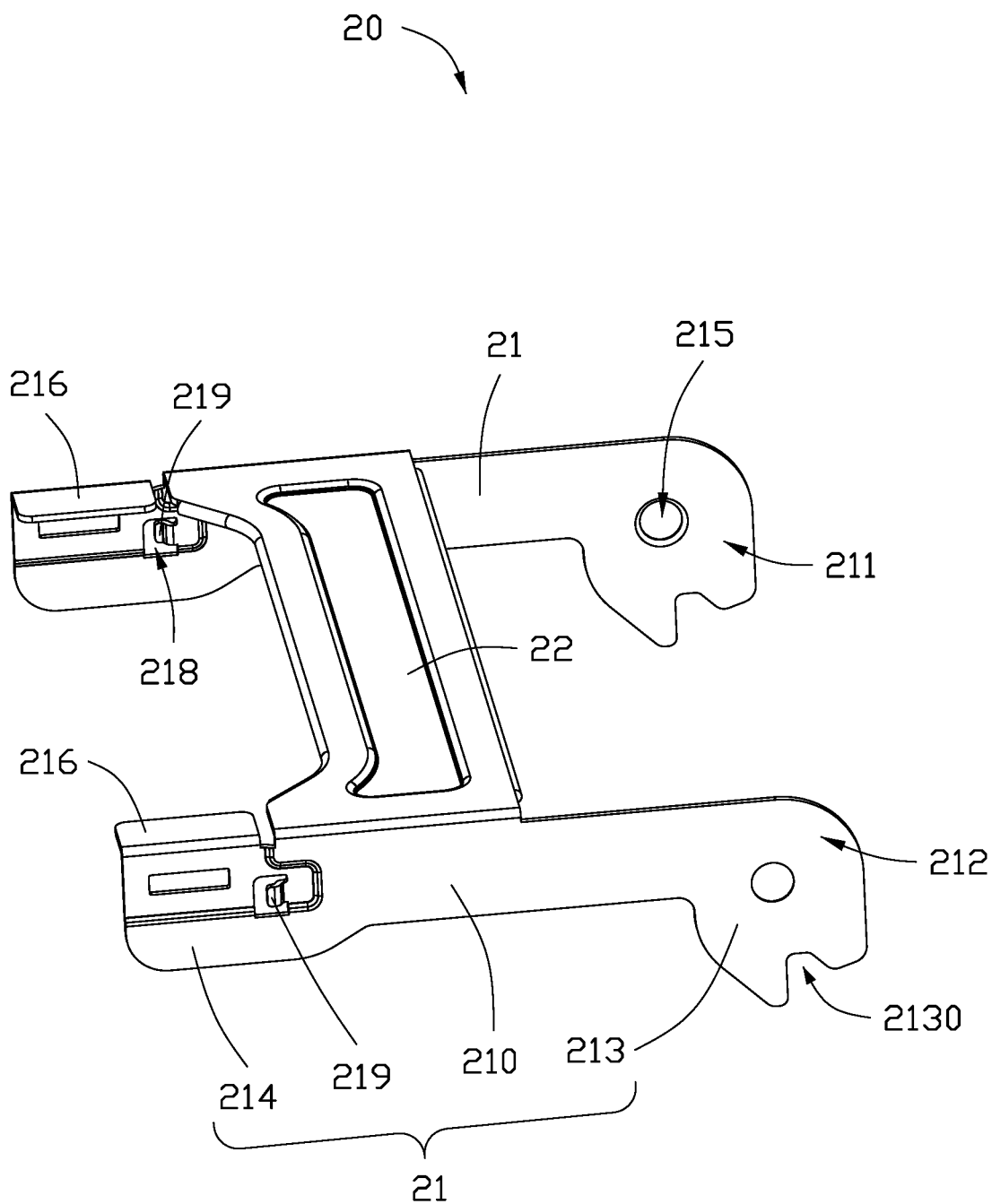
FIG. 6 is a perspective view of a handle of the hard disk drive tray of FIG. 3.

Referring to FIG. 6, the handle 20 includes two handle operating portions 21 and a beam portion 22 connected to the two handle operating portions 21. one end of each handle operating portion 21 is flexibly connected to each side wall 11, and the other end of each handle operating portion 21 is capable of being lifted up under an external force. In at least one embodiment, the handle operating portion 21 is in a shape of a wrench.

Each handle operating portion 21 includes a third surface 211 perpendicular to the first surface 131 and a fourth surface 212 opposite to the third surface 211. The third surfaces 211 of the two handle operating portions 21 face to each other.

Each handle operating portion 21 further includes a first connecting portion 210, a first end 213, and a second end 214. The first connecting portion 210 is connected to the first end 213 and the second end 214. The first end 213 and the second end 214 are located on two ends of the first connecting portion 210. The first connecting portion 210, the first end 213, and the second end 214 are integrally formed. The first end 213 is equivalent to a head of a wrench, and the second end 214 and the first connecting portion 210 are equivalent to a holding portion of a wrench.

A third fixing hole 215 is defined in the first end 213. The third fixing hole 215 penetrates the handle operating portion 21 and opposite to the second fixing hole 112. The third fixing hole 215 and the second fixing hole 112 match with a second locating pin (not shown) to fix the handle 20 on the side wall 11 of the tray body 10. The handle operating portion 21 is capable pf rotating an angle "θ" with the second locating pin as a rotating axis. In at least one embodiment, θ=25°. In other embodiment, may be other angle, not limited to 25°.

An evading groove 2130 is defined in the first end 213. The evading groove 2130 penetrates the handle operating portion 21 and below the third fixing hole 215. An opening of the evading groove 2130 faces the third limiting groove 114. A first locating pin 622 passes through the evading groove 2130 and the third limiting groove 114. The handle operating portion 21 rotates around the first locating pin 622.

Each handle operating portion 21 further includes a convex portion 216 formed on the second end 214. The convex portion 216 extends from the third surface 211 to the other one handle operating portion 21. The convex portion 216 supports the elastic locking member 40.

The second end 214 further includes a second limiting groove 217 below the convex portion 216. The second limiting groove 217 is a narrow slot. An extending direction of the second limiting groove 217 is consistent with a length direction of the handle operating portion 21. The second limiting groove 217 is used to receive a second limiting portion 47 (see in FIG. 13) of the elastic locking member 40. A length of the second limiting groove 217 is greater than that of the second limiting portion 47.

The second end 214 further includes a first limiting groove 218 located on one end of the second limiting groove 217 close to the beam portion 22. The first limiting groove 218 is used to receive one end of a locking portion 45 (see in FIGS. 13 and 14) of the elastic locking member 40.

The handle operating portion 21 further includes a second clamping portion 219. One end of the second clamping portion 219 is fixed on an inner wall of the first limiting groove 218 close to the beam portion 22, the other end of the second clamping portion 219 obliquely extends away from the fourth surface 212. The second clamping portion 219 is used to stop the locking portion 45 of the elastic locking member 40, so as to limit an operating range of the elastic locking member 40.

Both ends of the beam portion 22 are respectively fixed on the first connecting portion 210 of the two handle operating portions 21.

Figure 10:
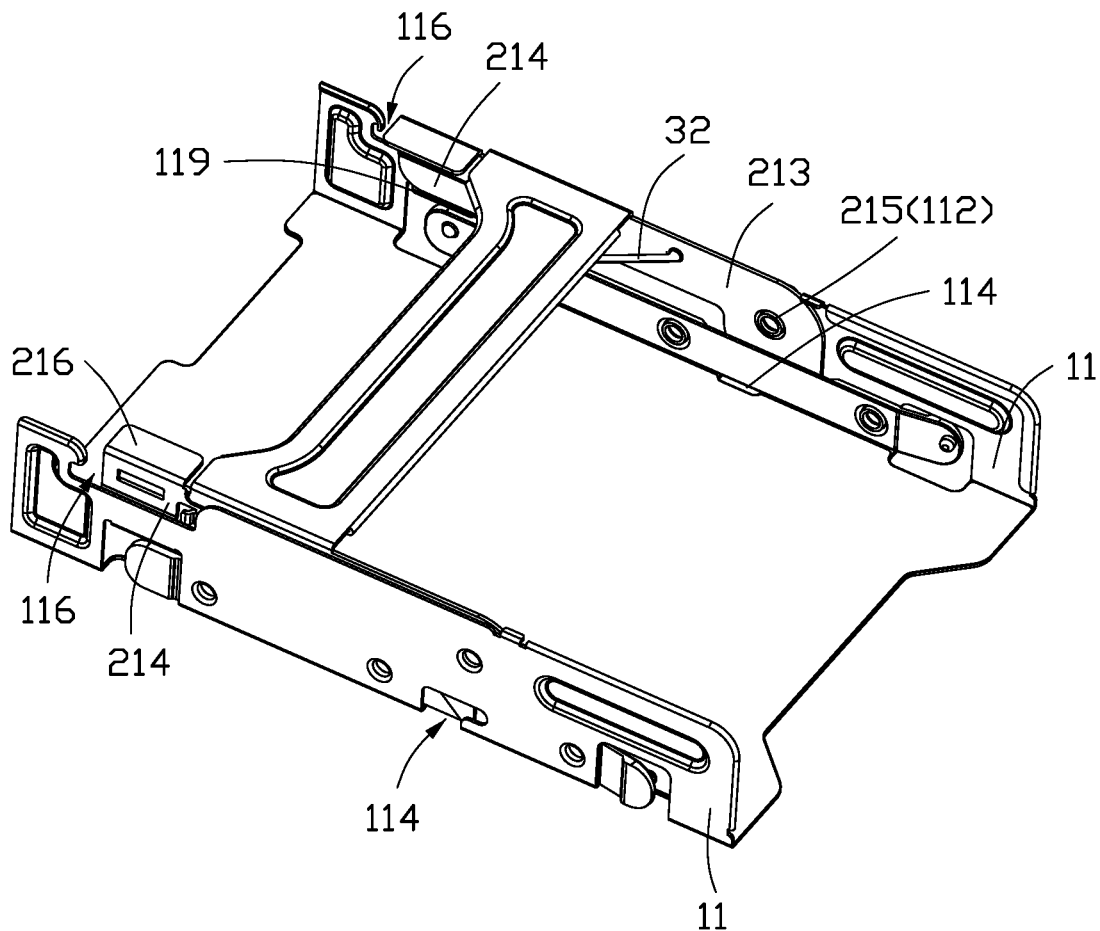
FIG. 10 is a perspective view of the tray body of FIG. 9 with the handle of FIG. 6.
Figure 11:
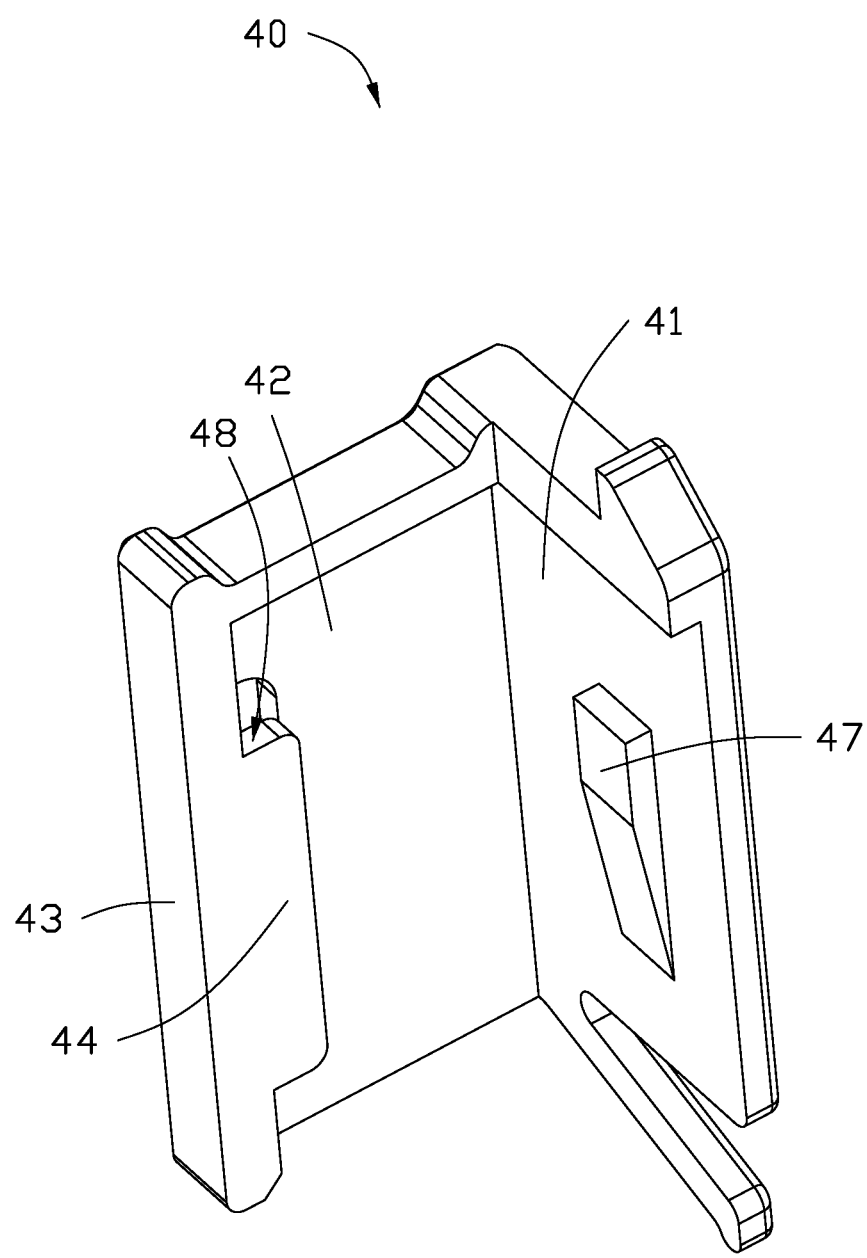
FIG. 11 is a perspective view of two elastic locking members of the hard disk drive tray of FIG. 3.
Figure 12:
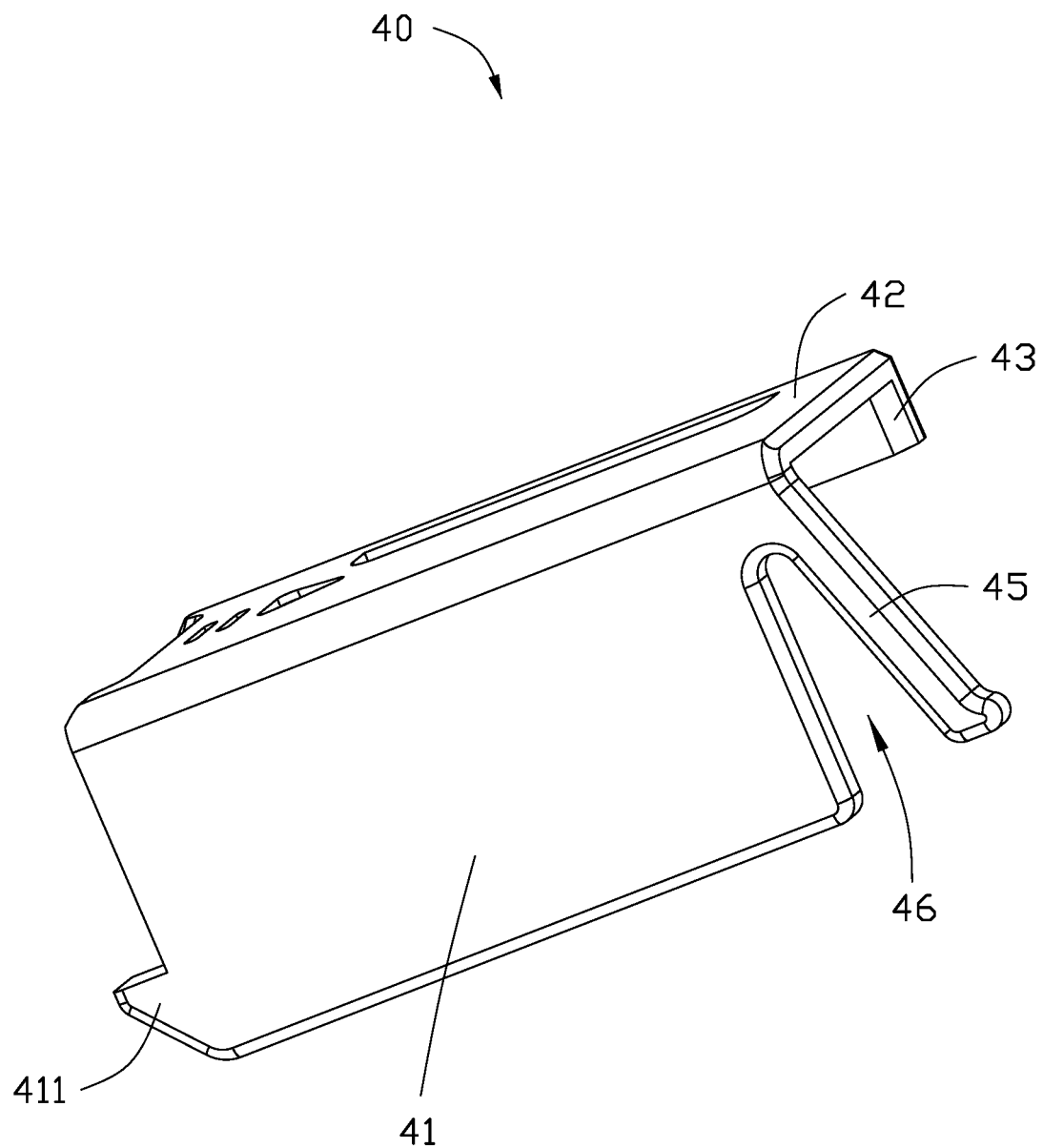
FIG. 12 is a perspective view of the elastic locking members of the hard disk drive tray of FIG. 11 from another angle.

Referring to FIG. 10, the first end 213 is rotatably connected to the side wall 11 of the tray body 10. When the handle 20 is in a pressed state, the second end 214 supports on the supporting portion 119. When the handle 20 is in an open state, the second end 214 is away from the first evading groove116.

Figure 7:
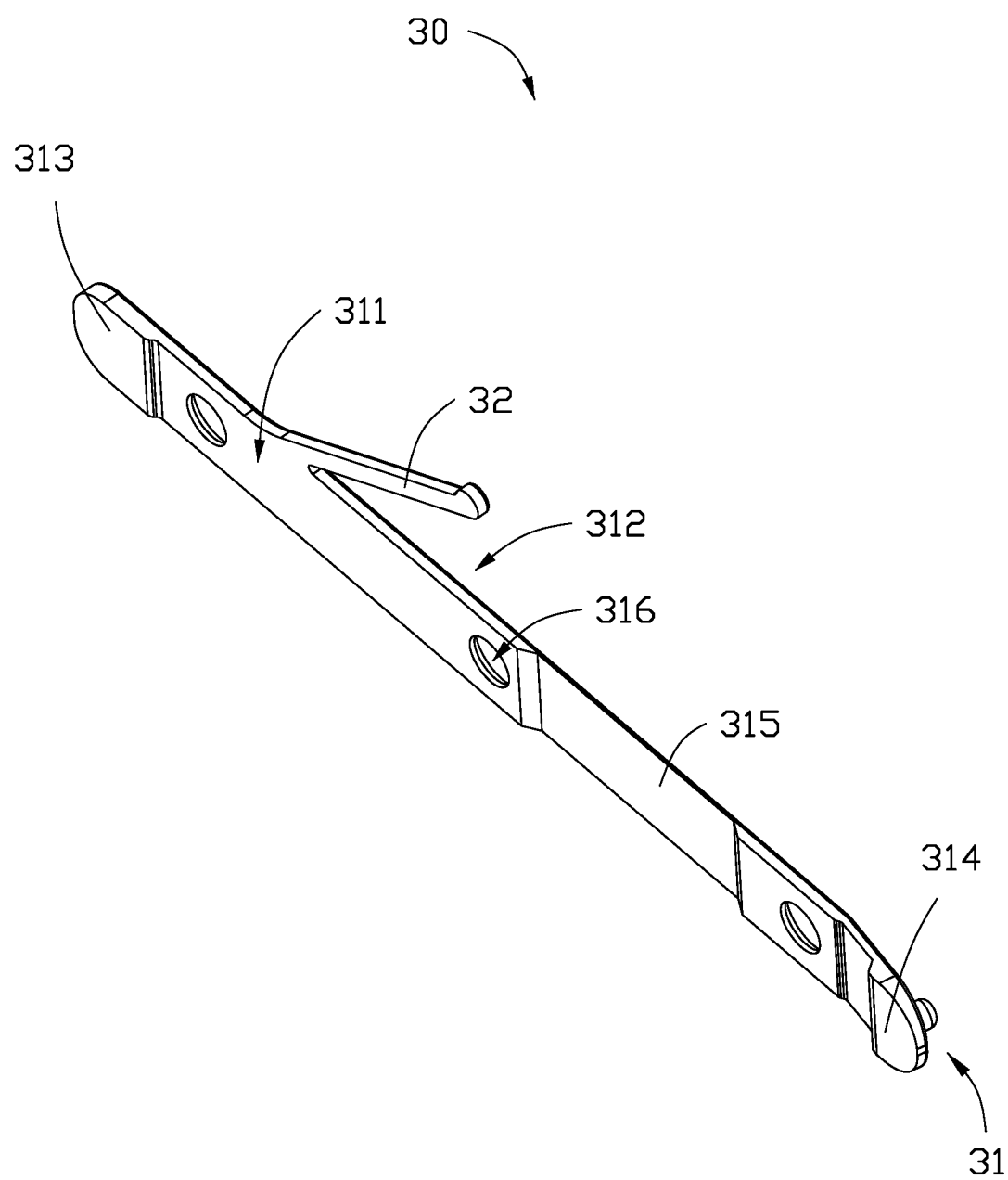
FIG. 7 is a perspective view of two elastic maintaining members of the hard disk drive tray of FIG. 3.
Figure 8:
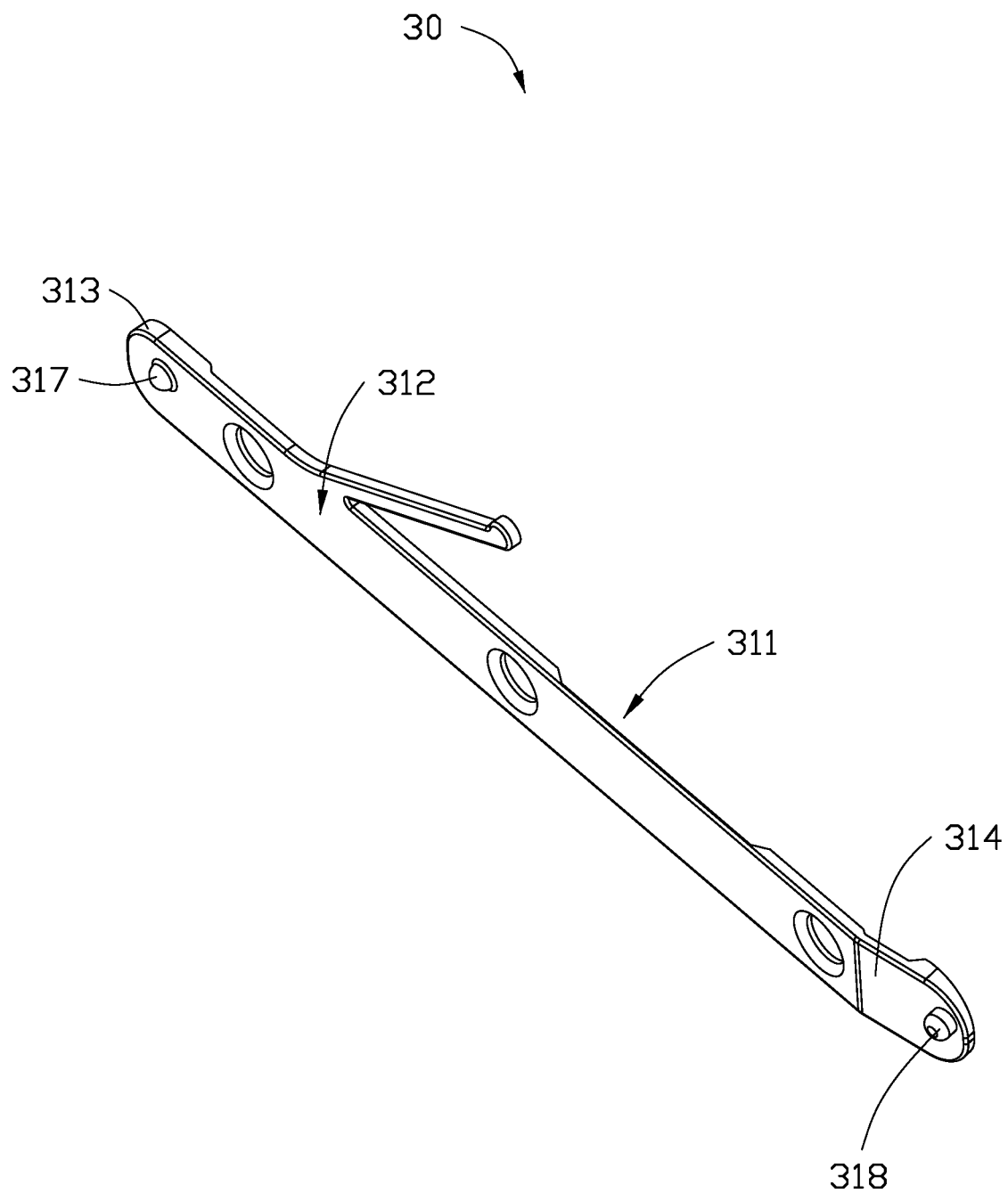
FIG. 8 is a perspective view of the elastic maintaining members of the hard disk drive tray of FIG. 7 from another angle.
Figure 9:
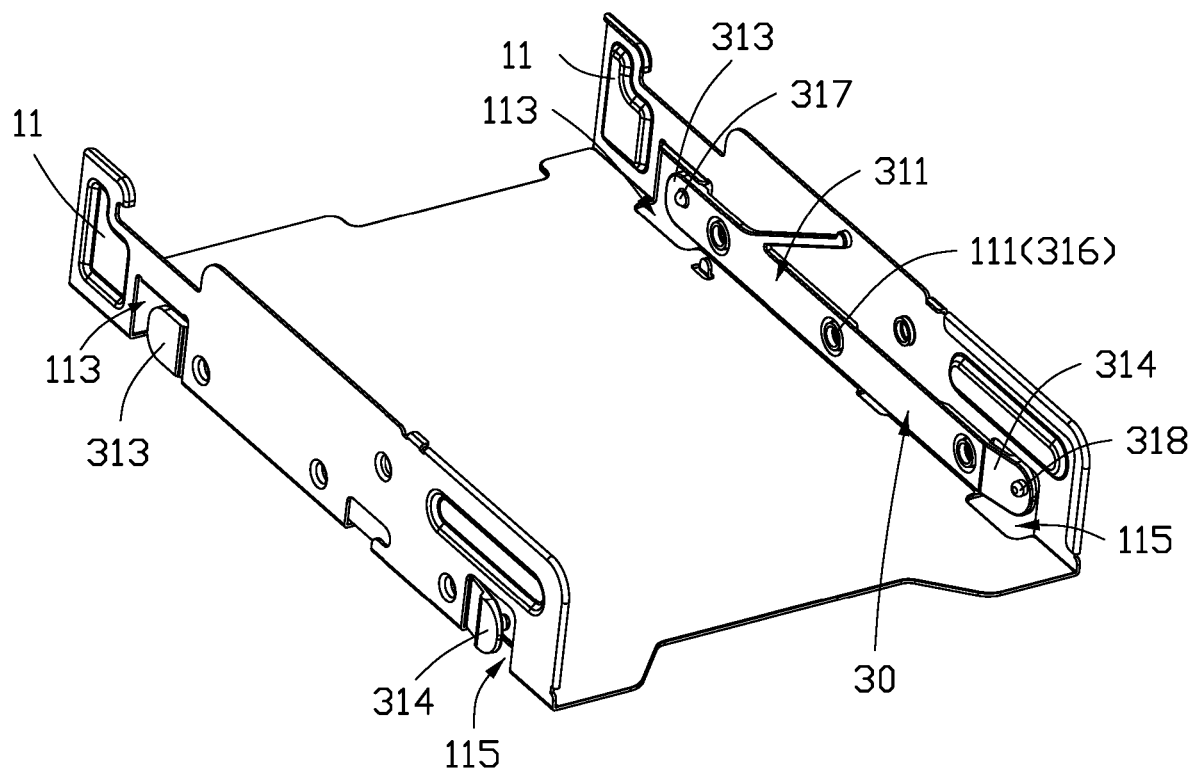
FIG. 9 is a perspective view of the tray body of FIG. 5 with the elastic maintaining members of FIG. 7 and FIG. 8.

Referring to FIGS. 7 to 9, each elastic maintaining member 30 includes a main body portion 31 and an extending portion 32. The extending portion 32 is formed by obliquely extending from one side of the main body portion 31.

The main body portion 31 includes a fifth surface 311 facing the side wall 11 and a sixth surface 312 opposite to the fifth surface 311. The main body portion 31 further includes a second connecting portion 315, a third end portion 313, and a fourth end portion 314. The second connecting portion 315 is connected to the third end portion 313 and the fourth end portion 314. The second connecting portion 315, the third end portion 313, and the fourth end portion 314 are integrally formed. The third end portion 313 and the fourth end portion 314 are exposed from the fourth evading groove 113 and the third evading groove 115, respectively.

At least two fourth fixing holes 316 are defined in the second connecting portion 315. The fourth fixing holes 316 are opposite to the first fixing holes 111. The first fixing hole 111 and the fourth fixing hole 316 match with a third locating pin (not shown) to fix the elastic maintaining member 30 on the side wall 11 of the tray body 10.

The main body portion 31 further includes a first locating pin portion 317 and a second locating pin portion 318. The first locating pin portion 317 and the second locating pin portion 318 are located on the sixth surface 312. The first locating pin portion 317 is fixed on the third end portion 313, and the second locating pin portion 318 is fixed on the fourth end portion 314. The first locating pin portion 317 and the second locating pin portion 318 can be inserted into the corresponding locating holes (not shown) on the hard disk drive 300 under external force to fix the hard disk drive 300 (see FIG. 1).

Referring to FIGS. 11 to 14, each elastic locking member 40 includes a first side portion 41, a top portion 42 perpendicularly connected to the first side portion 41, a second side portion 43 perpendicularly connected to the top portion 42, a first limiting portion 44 fixed on the second side portion 43, a second limiting portion 47 fixed on the first side portion 41, and a locking portion 45 obliquely extending from one end of the top portion 42. The second side portion 43 faces the first side portion 41. The first limiting portion 44 faces the first side portion 41 and is parallel to the top portion 42. The second limiting portion 47 and the first limiting portion 44 are located on a same side of the first side portion 41.

A receiving space 48 is defined by the top portion 42, the second side portion 43, and the first limiting portion 44. The receiving space 48 is used to receive the convex portion 216.

A spacing groove 46 is formed between the locking portion 45 and the first side portion 41. In at least one embodiment, the spacing groove 46 is V-shaped.

A third clamping portion 411 is formed on one end of the first side portion 41 away from the locking portion 45. The third clamping portion 411 is away from the top portion 42.

A vertical distance from the top portion 42 to the first limiting portion 44 is slightly larger than a thickness of the convex portion 216.

In at least one embodiment, an extending length of the second side portion 43 in a direction perpendicular to the top portion 42 is smaller than that of the first side portion 41.

Figure 13:
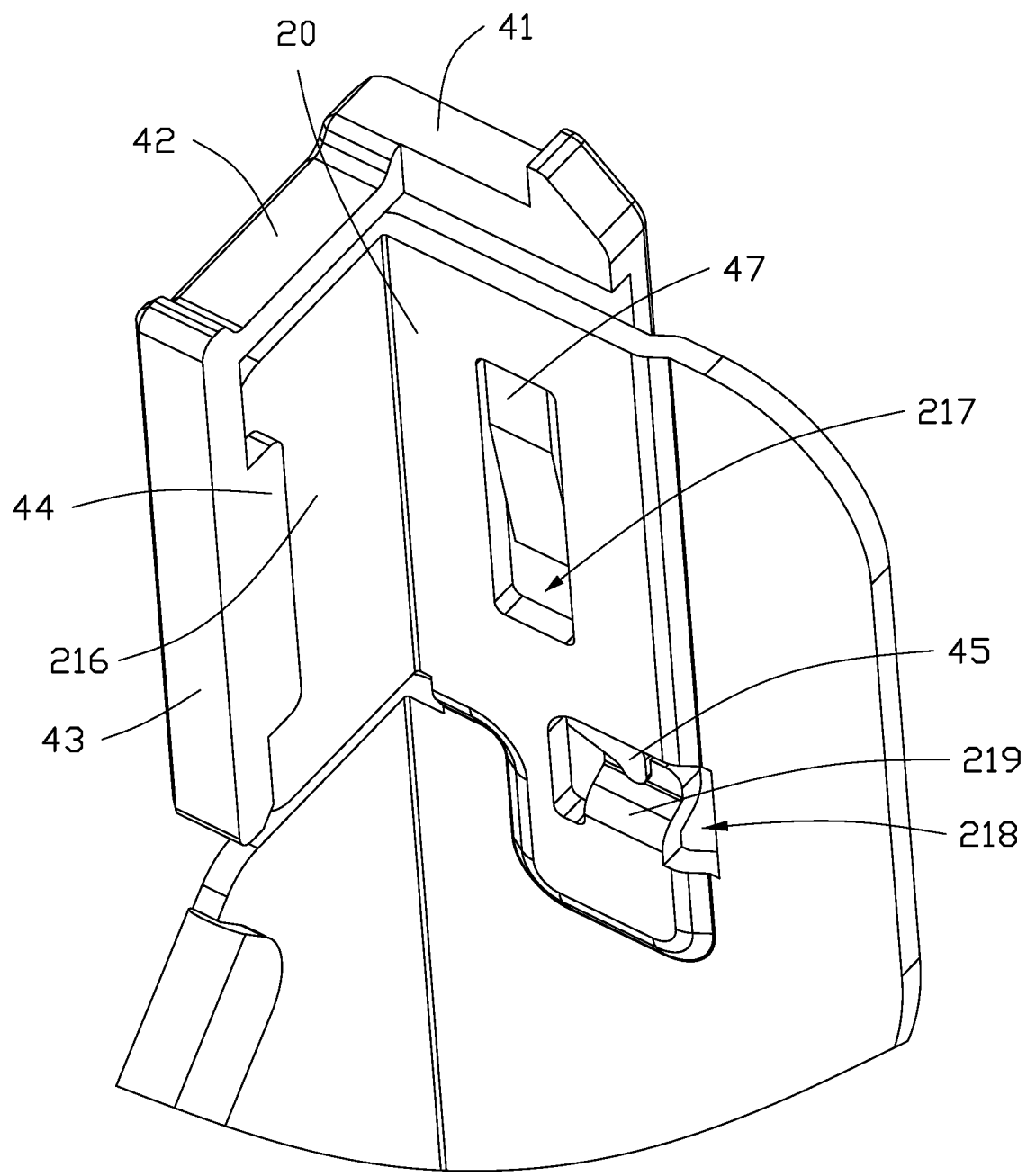
FIG. 13 is a perspective view showing the elastic locking members of FIG. 11 and FIG. 12 are mounted on the handle of FIG. 6.
Figure 14:
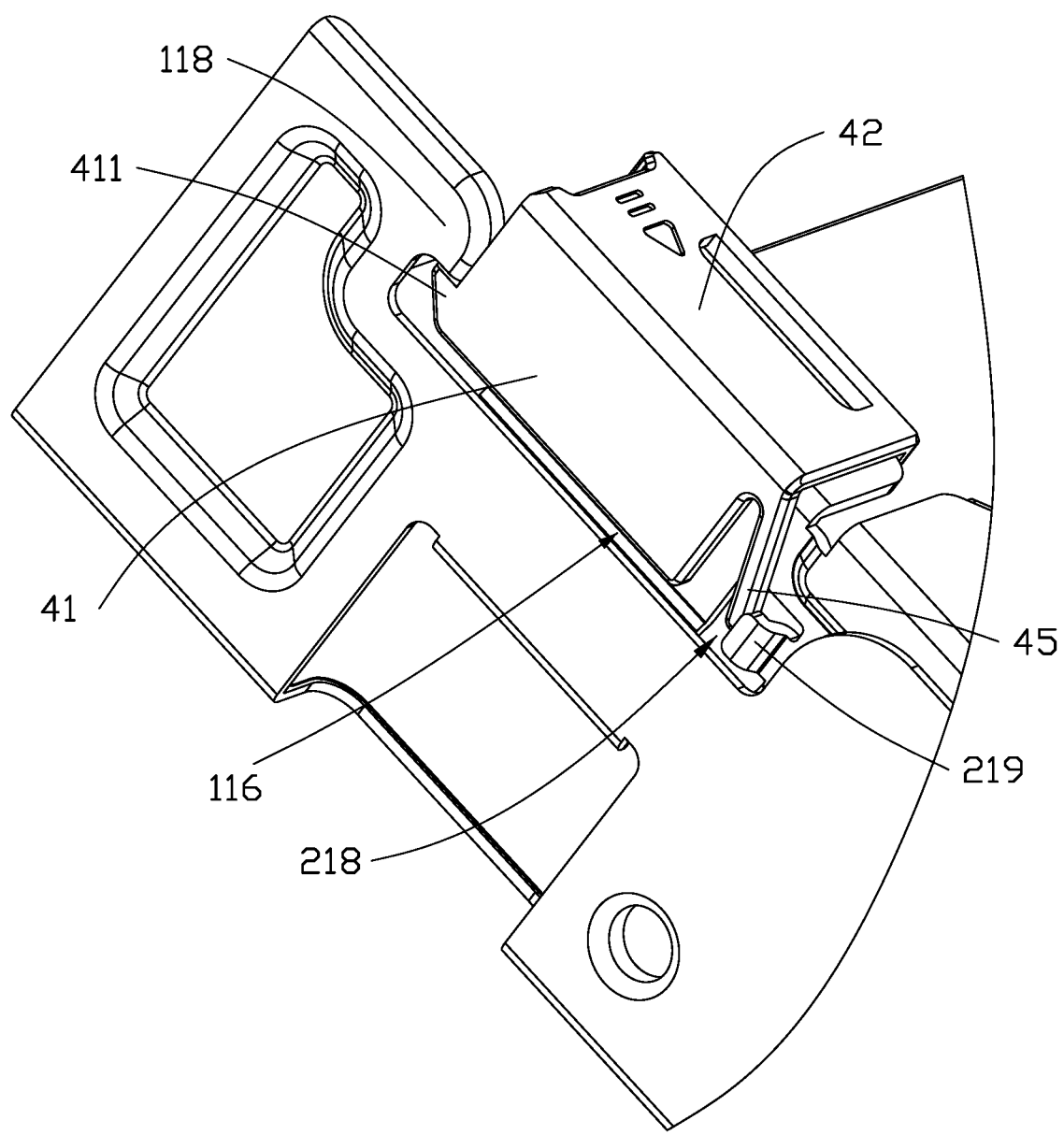
FIG. 14 is a partial enlarged view showing the elastic locking members of FIG. 13 are locked on the tray body of FIG. 5.

Referring to FIGS. 13-14, when the two elastic locking members 40 are assembled to the handle 20, the top portion 42 is attached to the convex portion 216, the convex portion 216 is received in the receiving space 48, the second limiting portion 47 is received in the second limiting groove 217, one end of the locking portion 45 away from the top portion 42 is received in the first limiting groove 218 and blocked by the second clamping portion 219, and the third clamping portion 411 is inserted into the first evading groove116 and blocked by the first clamping portion 118. When the elastic maintaining member 30 is pushed toward the second clamping portion 219, one end of the locking portion 45 away from the top portion 42 is further pushed toward the second clamping portion 219 and deformed, the third clamping portion 411 is separated from the first clamping portion 118.

A process of assembling the hard disk drive 300 into the hard disk drive tray module 1000 including: firstly, the elastic locking member 40 is pushed toward the second clamping portion 219 to make the third clamping portion 411 be separated from the first clamping portion 118, and then, the handle 20 is lifted up to a fixed angle θ. Secondly, the hard disk drive 300 is put into the tray body 10, and the first locating pin portion 317 of the elastic maintaining member 30 and the second locating pin portions 318 respectively face corresponding locating holes on the hard disk drive 300. Thirdly, the raised end of the handle 20 is pressed on the supporting portion 119, and the elastic locking member 40 is pushed toward the second clamping portion 219 until the third clamping portion 411 can enter into the first evading groove116. Since the elastic locking member 40 has elasticity, when the elastic locking member 40 is stopped, the elastic locking member 40 will return to an original state. At this time, the third clamping portion 411 is blocked by the second clamping portion 118 to fix the hard disk drive 300 in the hard disk drive tray 100. Finally, the hard disk drive tray 100 with the hard disk drive 300 is installed into the tray receiving grooves 66 of the tray fixing member 600. At this time, the first locating pin 622 is inserted into the third limiting groove 114 and the evading groove 2130. The first locating pin portion 317 and the second locating pin portion 318 are inserted into the hard disk drive 300 by the separating plate 65. The limiting structure 133 passes through the fourth limiting groove 611.

A process of removing the hard disk drive 300 from the hard disk drive tray module 1000 is as follows: firstly, one end of the hard disk drive tray 100 away from the second side plate 63 is lifted up to make the limiting structure 133 be separated from the fourth limiting groove 611, and the hard drive tray 100 is pulled out. Secondly, the elastic locking member 40 is pushed toward the second clamping portion 219 until the third clamping portion 411 is separated from the first clamping portion 118, and then the handle 20 is lifted upward the fixed angle θ. Thirdly, the hard disk drive 300 is lifted up to make the first locating pin portion 317 and the second locating pin portion 318 to be separated from the corresponding locating holes on the hard disk drive 300. Finally, the hard disk drive 300 is removed from the hard disk drive tray module 1000.

With the embodiments described above, the hard disk drive 300 of the hard disk drive tray module 1000 and the hard disk drive tray 100 can be assembled and dismounted without using tools, which can reduce costs and the space occupied.

The embodiments shown and described above are only examples. Many details are often found in the art such as the other features of a hard disk drive tray and a hard disk drive tray module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A hard disk drive tray comprising:
   a tray body, wherein the tray body comprises a bottom wall and two side walls connected to the bottom wall, a first evading groove is defined in each side wall, the first evading groove penetrates a surface of the side wall away from the bottom wall; and the side wall comprises a first clamping portion extending from an inner wall of the first evading groove;
   a handle, wherein the handle comprises two handle operating portions opposite to each other and a beam portion connected to the two handle operating portions; one end of each handle operating portion is flexibly connected to each side wall, and the other end of each handle operating portion is capable of being lifted up under an external force; a first limiting groove is defined in one end of each handle operating portion; and a second clamping portion obliquely extends from an inner wall of the first limiting groove; and
   two elastic locking members formed on two ends of the two handle operating portions; wherein each elastic locking member comprises a first side portion, a top portion perpendicularly connected to the first side portion, and a locking portion obliquely extending from one end of the top portion; a third clamping portion formed on one end of the first side portion away from the locking portion; the elastic locking member is capable of moving on one end of the handle operating portion; one end of the locking portion away from the top portion is blocked by the second clamping portion, and the third clamping portion is blocked by the first clamping portion; and when the elastic locking member is pushed toward the second clamping portion, the third clamping portion is separated from the first clamping portion.

2. The hard disk drive tray of claim 1, wherein each elastic locking member further comprises a second side portion perpendicularly connected to the top portion, a first limiting portion fixed on the second side portion, and a second limiting portion fixed on the first side portion; each handle operating portion further comprises a first connecting portion, a first end, a second end, and a convex portion; the first connecting portion is connected to the first end and the second end; the first end is fixed on the side wall; the convex portion is formed on the second end; a second limiting groove is defined in the second end; the convex portion is received in a receiving space defined by the top portion, the second side portion, and the first limiting portion; and the second limiting portion is received in the second limiting groove.

3. The hard disk drive tray of claim 1, wherein the hard disk drive tray further comprises two elastic maintaining members fixed on the two side walls; each elastic maintaining member comprises a main body portion; the main body portion further comprises a second connecting portion, a third end portion, and a fourth end portion; a fourth evading groove, a third limiting groove, and a third evading groove are defined in each side wall; the third limiting groove is formed between the fourth evading groove and the third evading groove; and the third end portion and the fourth end portion are exposed from the fourth evading groove and the third evading groove.

4. The hard disk drive tray of claim 3, wherein the main body portion further comprises a first locating pin portion formed on the third end portion and a second locating pin portion formed on the fourth end; the first locating pin portion and the second locating pin portion are capable of being inserted into a hard disk drive under external force.

5. The hard disk drive tray of claim 1, further comprising an insulation sheet; wherein at least one connecting hole is defined in the insulation sheet; the bottom wall further comprises at least one fourth clamping portion; and the fourth clamping portion passes through the connecting hole to fix the insulation sheet on the bottom wall.

6. The hard disk drive tray of claim 1, wherein at least one limiting structure is defined in the bottom wall; the limiting structure protrudes toward a direction away from the handle.

7. A hard disk drive tray module for carrying and fixing at least one hard disk drive, comprising:
   a tray fixing member; and
   at least one hard disk drive tray received and fixed in the tray fixing member; wherein the hard disk drive is received and fixed in the hard disk drive tray; the hard disk drive tray comprising:
   a tray body, wherein the tray body comprises a bottom wall and two side walls connected to the bottom wall, a first evading groove is defined in each side wall, the first evading groove penetrates a surface of the side wall away from the bottom wall; and the side wall comprises a first clamping portion extending from an inner wall of the first evading groove;

a handle, wherein the handle comprises two handle operating portions opposite to each other and a beam portion connected to the two handle operating portions; one end of each handle operating portion is flexibly connected to each side wall, and the other end of each handle operating portion is capable of being lifted up under an external force; a first limiting groove is defined in one end of each handle operating portion; and a second clamping portion obliquely extends from an inner wall of the first limiting groove; and two elastic locking members formed on two ends of the two handle operating portions; wherein each elastic locking member comprises a first side portion, a top portion perpendicularly connected to the first side portion, and a locking portion obliquely extending from one end of the top portion; a third clamping portion formed on one end of the first side portion away from the locking portion; the elastic locking member is capable of moving on one end of the handle operating portion; one end of the locking portion away from the top portion is blocked by the second clamping portion, and the third clamping portion is blocked by the first clamping portion; and when the elastic locking member is pushed toward the second clamping portion, the third clamping portion is separated from the first clamping portion.

8. The hard disk drive tray module of claim 7, wherein the tray fixing member comprises a bottom plate, two first side plates opposite to each other, a second side plate connected to the two first side plates, a top plate, and at least one separating plate formed on the bottom plate; the two first side plates and the second side plate are connected to the bottom plate; the top plate extends from the second side plate; the separating plate separates the tray fixing member into at least two tray receiving grooves; and the hard disk drive tray is received and fixed in one of the tray receiving grooves.

9. The hard disk drive tray module of claim 8, wherein at least one limiting structure is defined in the bottom wall; the limiting structure protrudes toward a direction away from the handle; at least one fourth limiting groove is defined in the bottom plate; and the limiting structure passes through the fourth limiting groove to limit the hard disk drive tray to move.

10. The hard disk drive tray module of claim 8, wherein the hard disk drive tray further comprises two elastic maintaining members fixed on the two side walls; each elastic maintaining member comprises a main body portion; the main body portion further comprises a second connecting portion, a third end portion, and a fourth end portion; a fourth evading groove, a third limiting groove, and a third evading groove are defined in each side wall; the third limiting groove is formed between the fourth evading groove and the third evading groove; the third end portion and the fourth end portion are exposed from the fourth evading groove and the third evading groove; a plurality of first locating holes are respectively defined in the separating plate and the two first side plates; a plurality of first locating pins are fixed in the plurality of first locating holes and pass through the third limiting groove; and the handle operating portion rotates around the first locating pin.

11. The hard disk drive tray module of claim 7, wherein each elastic locking member further comprises a second side portion perpendicularly connected to the top portion, a first limiting portion fixed on the second side portion, and a second limiting portion fixed on the first side portion; each handle operating portion further comprises a first connecting portion, a first end, a second end, and a convex portion; the first connecting portion is connected to the first end and the second end; the first end is fixed on the side wall; the convex portion is formed on the second end; a second limiting groove is defined in the second end; the convex portion is received in a receiving space defined by the top portion, the second side portion, and the first limiting portion; and the second limiting portion is received in the second limiting groove.

12. The hard disk drive tray module of claim 7, wherein the hard disk drive tray further comprises two elastic maintaining members fixed on the two side walls; each elastic maintaining member comprises a main body portion; the main body portion further comprises a second connecting portion, a third end portion, and a fourth end portion; a fourth evading groove, a third limiting groove, and a third evading groove are defined in each side wall; the third limiting groove is formed between the fourth evading groove and the third evading groove; and the third end portion and the fourth end portion are exposed from the fourth evading groove and the third evading groove.

13. The hard disk drive tray module of claim 12, wherein the main body portion further comprises a first locating pin portion formed on the third end portion and a second locating pin portion formed on the fourth end; the first locating pin portion and the second locating pin portion are capable of being inserted into the hard disk drive under external force.

14. The hard disk drive tray module of claim 7, wherein the hard disk drive tray further comprises an insulation sheet; wherein at least one connecting hole is defined in the insulation sheet; the bottom wall further comprises at least one fourth clamping portion; and the fourth clamping portion passes through the connecting hole to fix the insulation sheet on the bottom wall.

* * * * *